United States Patent [19]
Holowko et al.

[11] Patent Number: 5,438,422
[45] Date of Patent: Aug. 1, 1995

[54] ERROR DETECTION APPARATUS AND METHOD FOR USE WITH ENGRAVERS

[75] Inventors: Paul L. Holowko, Spring Valley; David R. Seitz, Vandalia; Curtis Woods, Centerville, all of Ohio

[73] Assignee: Ohio Electronic Engravers, Inc., Dayton, Ohio

[21] Appl. No.: 38,679

[22] Filed: Mar. 26, 1993

Related U.S. Application Data

[63] Continuation-in-part of Ser. No. 22,127, Feb. 25, 1993.

[51] Int. Cl.⁶ .................. B41C 1/02; G06F 17/00
[52] U.S. Cl. ................. 358/299; 364/474.37
[58] Field of Search ............ 358/299, 296; 346/1.1; 409/204, 207, 208; 364/474.12, 474.22, 474.26, 474.35, 474.37; 318/638, 640; 356/379

[56] References Cited

U.S. PATENT DOCUMENTS

| | | | |
|---|---|---|---|
| 2,493,628 | 1/1950 | Harley | 88/14 |
| 2,777,058 | 1/1957 | Boyajean | 250/27 |
| 2,874,479 | 2/1959 | Farber | 33/185 |
| 2,943,564 | 7/1960 | Demer | 101/93 |
| 3,612,753 | 10/1971 | Korman | 178/5.2 |
| 3,652,992 | 3/1972 | Koll | 340/146.3 |
| 3,876,829 | 4/1975 | Schreiber | 178/7.3 |
| 3,904,816 | 9/1975 | Taudt et al. | 178/6 |
| 3,918,348 | 11/1975 | Runft | 318/571 X |
| 3,931,570 | 1/1976 | George et al. | 324/34 R |
| 3,956,583 | 5/1976 | Pugsley | 178/6.6 |
| 4,001,495 | 1/1977 | Tauszig | 358/294 |
| 4,003,311 | 1/1977 | Bardin | 101/426 |
| 4,012,584 | 3/1977 | Gascoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/256 |
| 4,240,118 | 12/1980 | Wellendorf et al. | 358/296 |
| 4,315,285 | 2/1982 | Sommer et al. | 358/280 |
| 4,342,050 | 7/1982 | Traino | 358/256 |
| 4,363,037 | 12/1982 | Taudt | 358/296 |
| 4,394,693 | 7/1983 | Shirley | 358/298 |
| 4,437,122 | 3/1984 | Walsh et al. | 358/166 |
| 4,451,856 | 5/1984 | Buechler | 358/299 |
| 4,503,468 | 3/1985 | Serinken et al. | 358/256 |
| 4,612,584 | 9/1986 | George et al. | 358/299 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,944,593 | 7/1990 | Kalstroem et al. | 356/379 |
| 4,972,323 | 11/1990 | Cauwet | 358/299 X |
| 5,029,011 | 7/1991 | Fraser | 358/299 |
| 5,229,861 | 7/1993 | Zozaka et al. | 358/299 |
| 5,293,426 | 3/1994 | Wouch et al. | 358/299 X |

OTHER PUBLICATIONS

The Gravure Ass'n of Amer., *The Gravure Engraving Manual* (1987).
Balcom, *Basic Rotogravure* (1988).
Heimann GmbH, *Drucktechnische Beratung-Graphischer Handel* (Pamphlet, Hamm, Germany, 1984).
Heimann GmbH, *Check-Master* (Pamphlet, Date Unknown).
Ahauser Tiefdruck-Gravuren GmbH & Co., *Engraving Tester ET2000* (Pamphlet, Date Unknown).
Promatec Graphique, *M2B2 modele depose Micro Surface Sarl* (Pamphlet, Antony, France, 1987).

(List continued on next page.)

Primary Examiner—Benjamin R. Fuller
Assistant Examiner—Eric Frahm
Attorney, Agent, or Firm—Biebel & French

[57] ABSTRACT

An error detection apparatus and method for use with engravers, such as gravure engravers. An error value E corresponding to the difference between a set of predetermined setup parameters and actual measurement of a portion of an engraved area on the cylinder is determined. The error value E is then used to adjust the engraver to engrave an actual cut or etch in accordance with the set of predetermined setup parameters. Advantageously, an error detection and correction system is suitable for providing a closed-loop system for engraving a cylinder. The apparatus and method may be used during initial setup or during normal operation of the engraver.

53 Claims, 9 Drawing Sheets

OTHER PUBLICATIONS

*VIP—Video–Image–Processing* (Pamphlet, Author Unknown, Date Unknown).
"Numerical Analysis: A Practical Approach", Melvin J. Maron, p. 188 (no date).
"The Image Processing Handbook", John C. Russ, pp. 105–113, (1992).
"Numerical Recipes in C, The Art of Scientific Computing", William H. Press, Brian P. Flannery, Saul A. Teukolsky and William T. Vetterling; pp. 452–460 (1988).
"Datwyler", Max Daetwyler Corporation, 13420 West Reese Blvd., Huntersville, N.C. 28078, undated brochure.
"Twin–Pilot", Maschinenfabrik Kasper Walter GmbH & Co. KG, Plinganserstrasse 22, 8000 Munchen 70, German, undated, brochure.

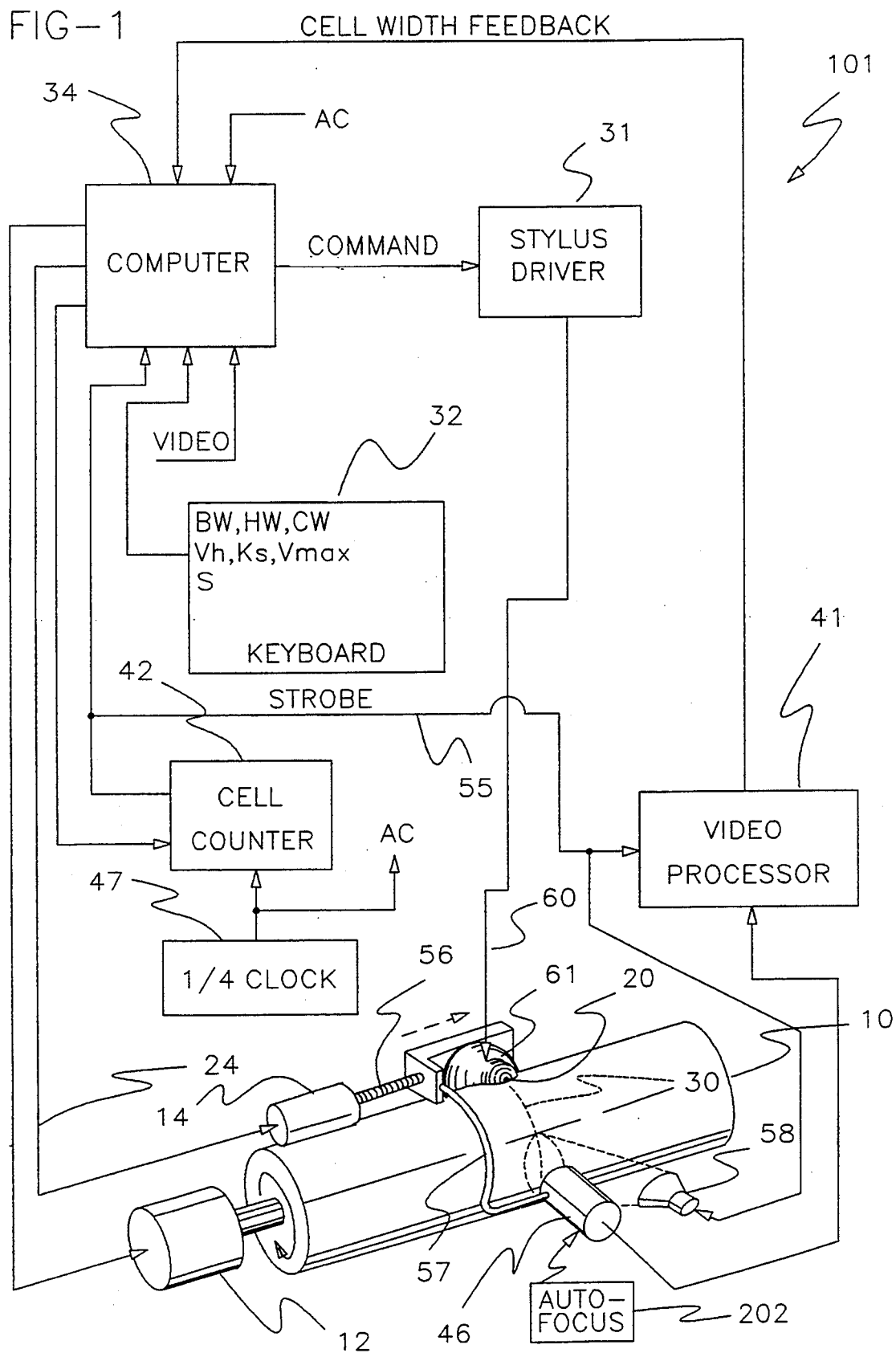

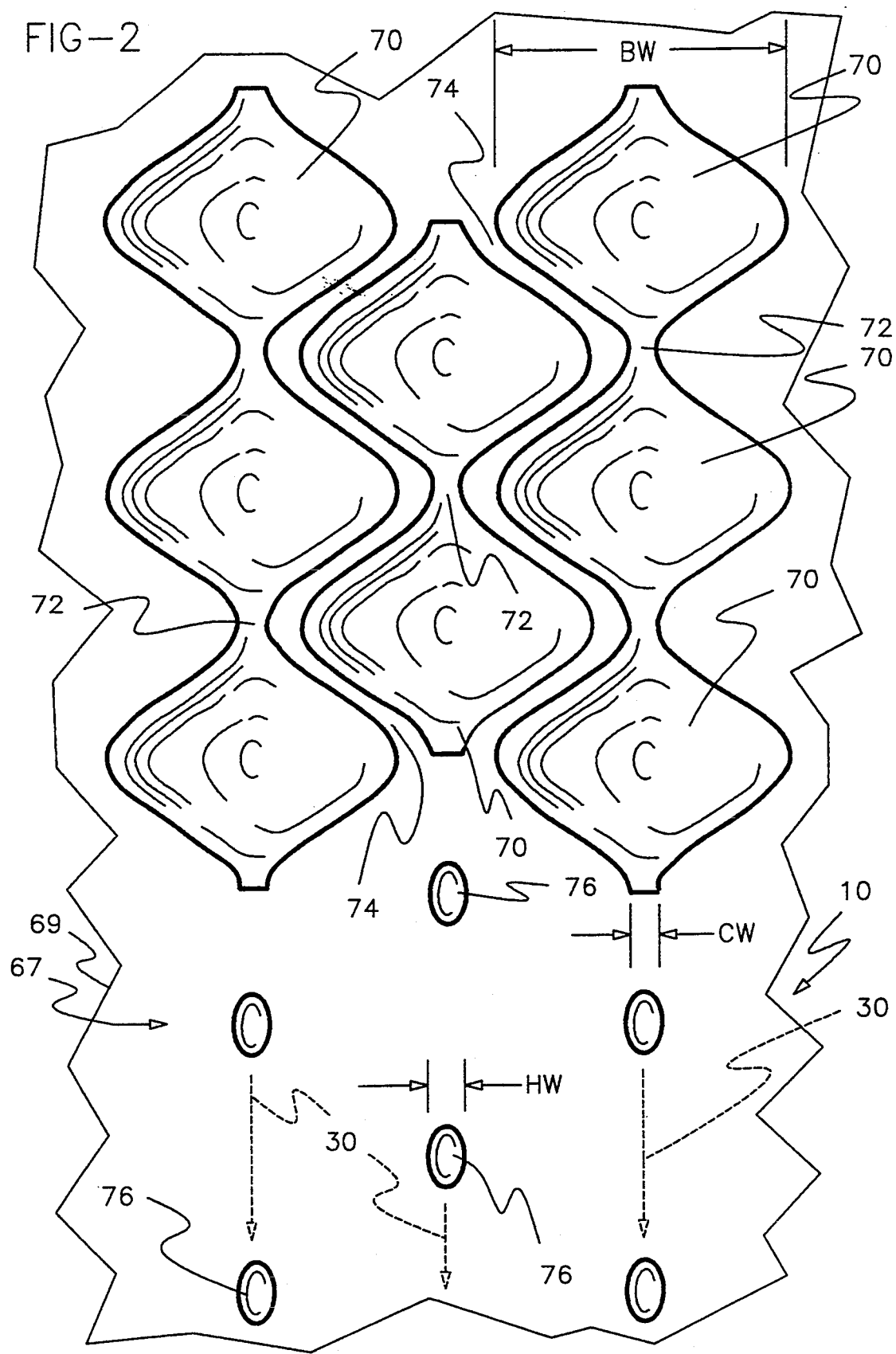

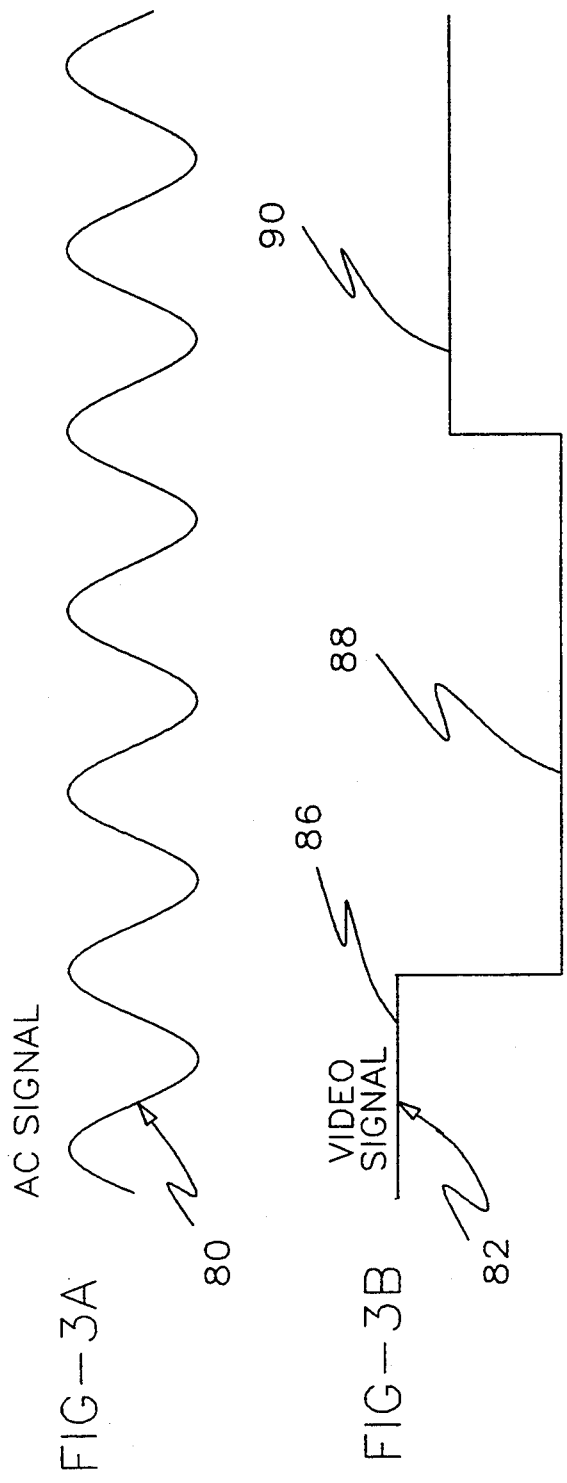
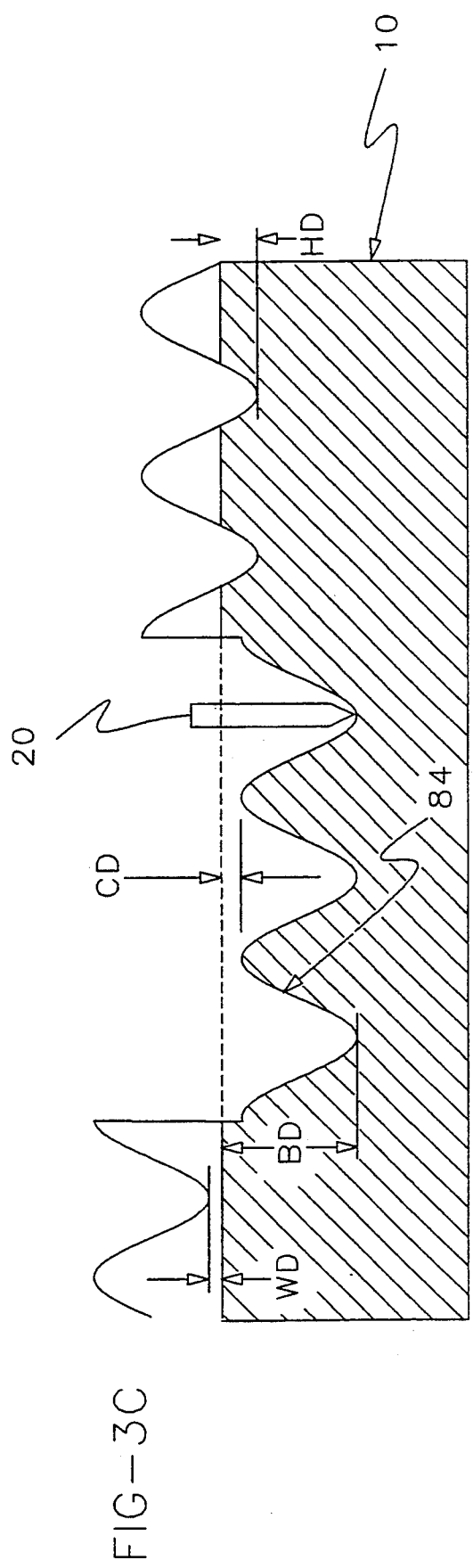
FIG-3A  AC SIGNAL
FIG-3B  VIDEO SIGNAL
FIG-3C

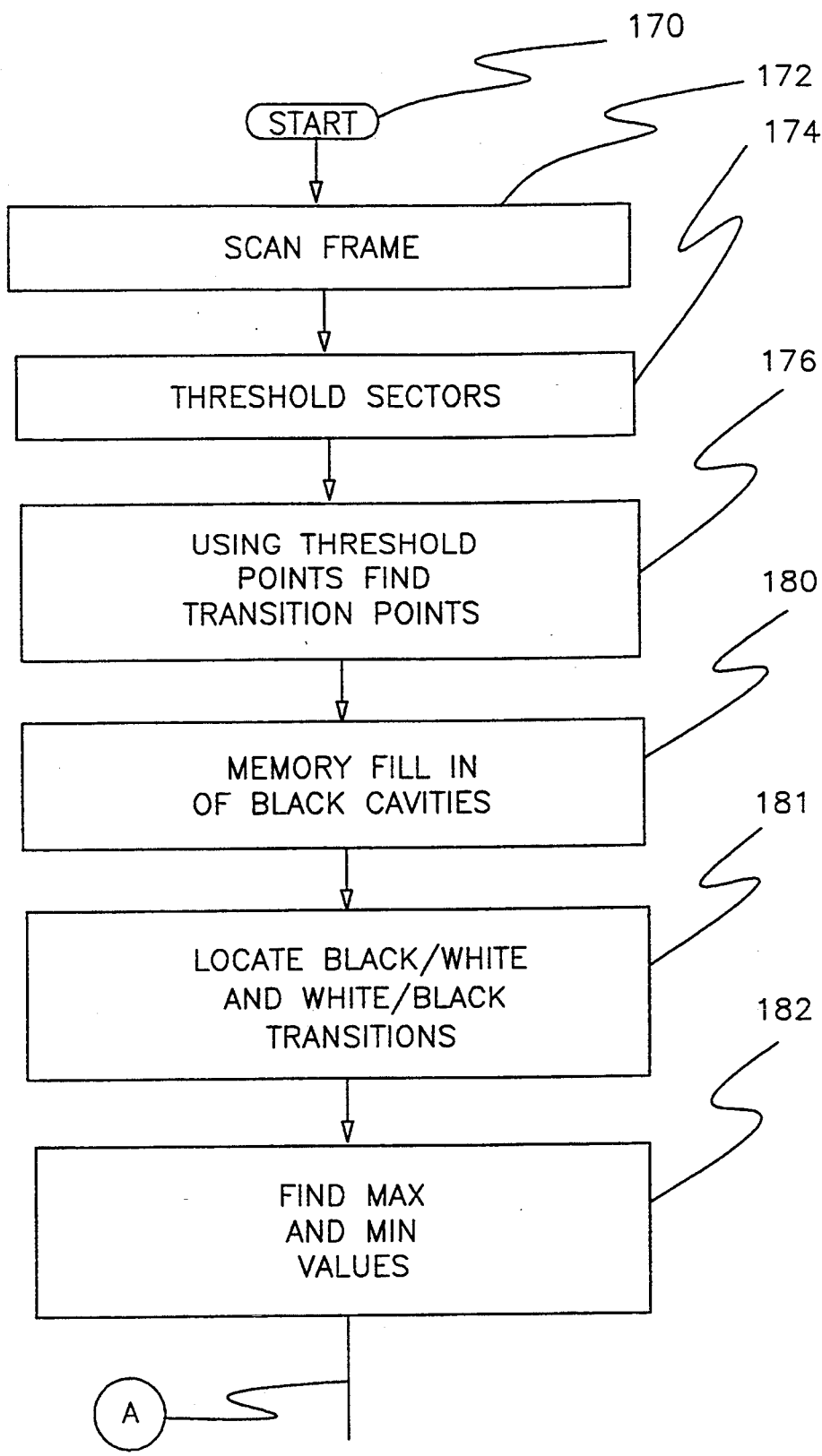

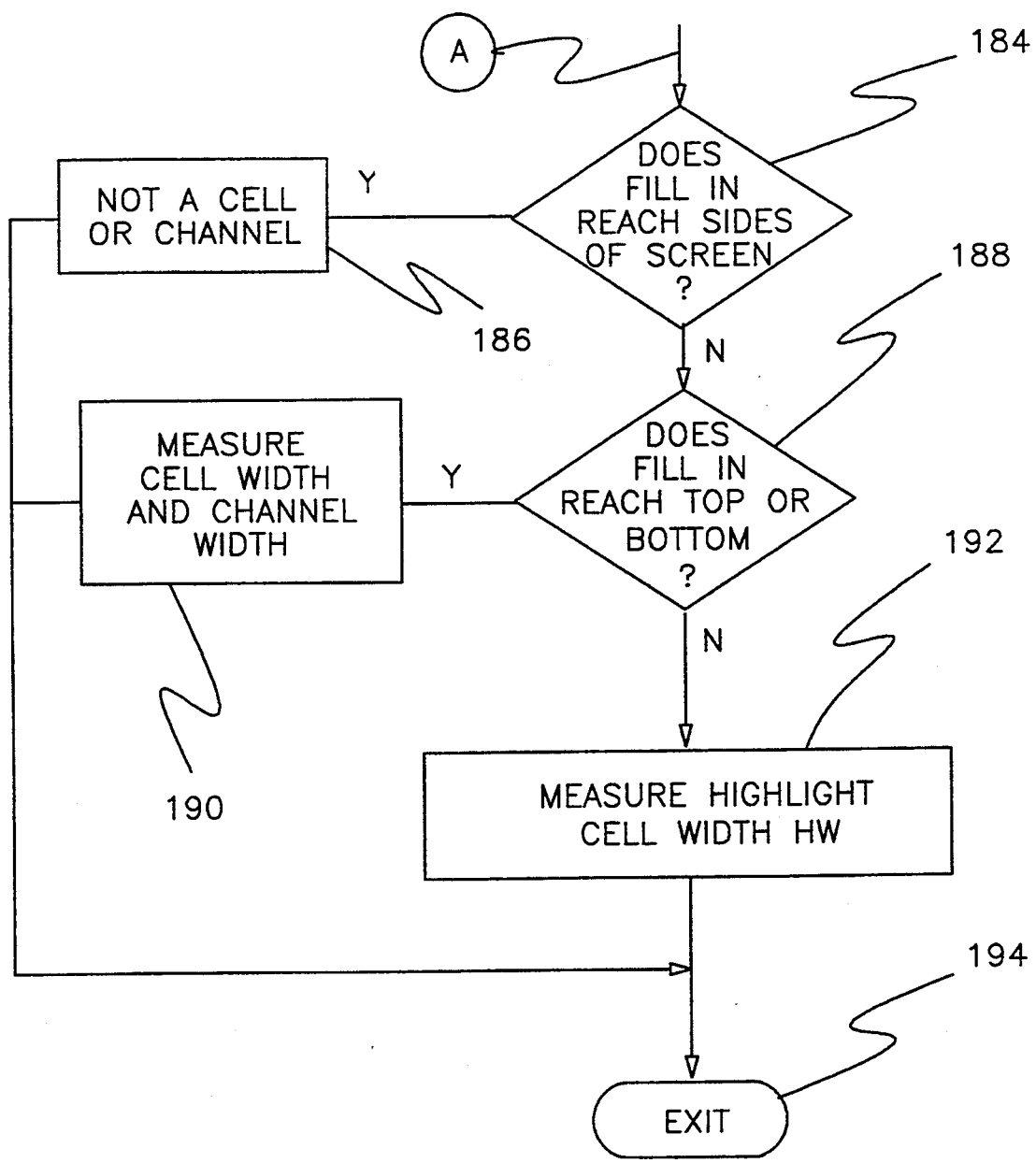

ERROR DETECTION APPARATUS AND METHOD FOR USE WITH ENGRAVERS

CROSS-REFERENCE TO RELATED APPLICATION

This application is a continuation-in-part of Ser. No. 08/022,127, filed Feb. 25, 1993.

BACKGROUND OF THE INVENTION

This invention relates to engraving heads of the general type disclosed in Buechler U.S. Pat. No. 4,450,486. Such engraving heads comprise a diamond stylus carried by a holder mounted on an arm projecting from a torsionally oscillated shaft. A sine wave driving signal is applied to a pair of opposed electromagnets to rotate the shaft through a maximum arc of approximately 0.25° at a frequency in the neighborhood of about 3,000 to 5,000 Hz.

A guide shoe is mounted on the engraving head in a precisely known position relative to the oscillating stylus. The engraving head is supported for tilting movement by a set of leaf springs secured to a rearwardly projecting bar. A DC motor rotates the bar so as to bring the guide shoe into contact with a printing cylinder to be engraved. When the guide shoe is in contact with the printing cylinder, the stylus oscillates from a position just barely touching the printing cylinder to a retracted position about 100 microns distant from the surface of the cylinder.

Once the guide shoe is in contact against the printing cylinder a video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the entire printing surface of the printing cylinder.

In engraving systems of the type taught by Buechler, it is necessary for the machine operator to perform a tedious trial and error setup procedure at one end of the printing cylinder prior to commencement of engraving. This procedure involves adjustment of the gain on amplifiers for the sine wave driving signal and the video signal so as to produce "black" printing cells of a desired depth together with connecting channels of another desired depth and clean non-engraved white cells. Each change of one of the control variables interacts with the others, and therefore the setup becomes an iterative process.

It is therefore seen that a need has existed for an engraving system which may be quickly and easily set up to engrave cells of precisely controlled dimensions in the surface of a gravure printing cylinder.

SUMMARY OF THE INVENTION

In one aspect, this invention comprises a method for adjusting an engraver to engrave a cylinder with an actual cut according to predetermined setup parameters, said method comprising the steps of: (a) determining an error value corresponding to the difference between said predetermined setup parameters and an actual measurement of a portion of an engraved area on said cylinder; and (b) using said error value to adjust said engraver to engrave said actual cut in accordance with said predetermined setup parameters.

In another aspect, this invention comprises a method for measuring a portion of an engraved area on a cylinder in an engraver, said method comprising the step of generating a plurality of actual dimension values corresponding to said portion.

In still another aspect, this invention comprises a system for measuring a portion of an engraved area on a cylinder in an engraver, said system comprising a measuring device for generating a plurality of actual dimension values corresponding to said portion.

In yet another aspect, this invention comprises an error correction system for use in an engraver suitable for engraving a cylinder with an actual cut in accordance with predetermined setup parameters, said error correction system comprising determining means for determining an error value corresponding to the difference between the predetermined setup parameters and a measurement of the actual dimensions of a portion of an engraved area on said cylinder; and a system coupled to said determining means for receiving said error value and also for adjusting said engraver to engrave said actual cut in accordance with said predetermined setup parameters.

The present invention also provides an engraving apparatus and method wherein a plurality of parameter signals are supplied to a setup circuit or computer for computing engraving parameters to control the engraving response of the engraving stylus to an input video signal. An input AC signal and an input video signal are multiplied by multiplication factors which are generated by the computer. The computer also generates a white offset signal which is combined with the above mentioned multiplication factors to produce a driving signal for the engraving stylus. The stylus then engraves cells of the desired geometry.

The computer is provided with input signals which indicate a desired black cell width, a desired channel width, a desired highlight cell width and the video voltage level at which a highlight cell of the desired width is to be engraved. The values of these parameters are used for solving a set of equations which produce the appropriate values for the two multiplication factors and the white offset.

A video camera is operated to produce a frame of video information including an image of a highlight which has been engraved by a video signal of a predetermined level. A video processing circuit measures the width of the cell which has been so imaged and reports it to the computer. The computer then adjusts the multiplication factors and the white offset through use of an error term which is equal to the difference between the expected cell width and the measured cell width.

BRIEF DESCRIPTION OF THE DRAWINGS

FIG. 1 is a schematic illustration, partly in perspective, of a programmable engraving system according to the present invention;

FIG. 2 is a schematic illustration of a series of cells engraved in a printing cylinder;

FIGS. 3A-3C are time-correlated schematic illustrations of AC and video signals for controlling an engraving stylus and the engraving movement which results therefrom;

FIGS. 8A and 8B, taken together, show a flow chart of another measuring algorithm.

DESCRIPTION OF THE PREFERRED EMBODIMENT

Figure 4:
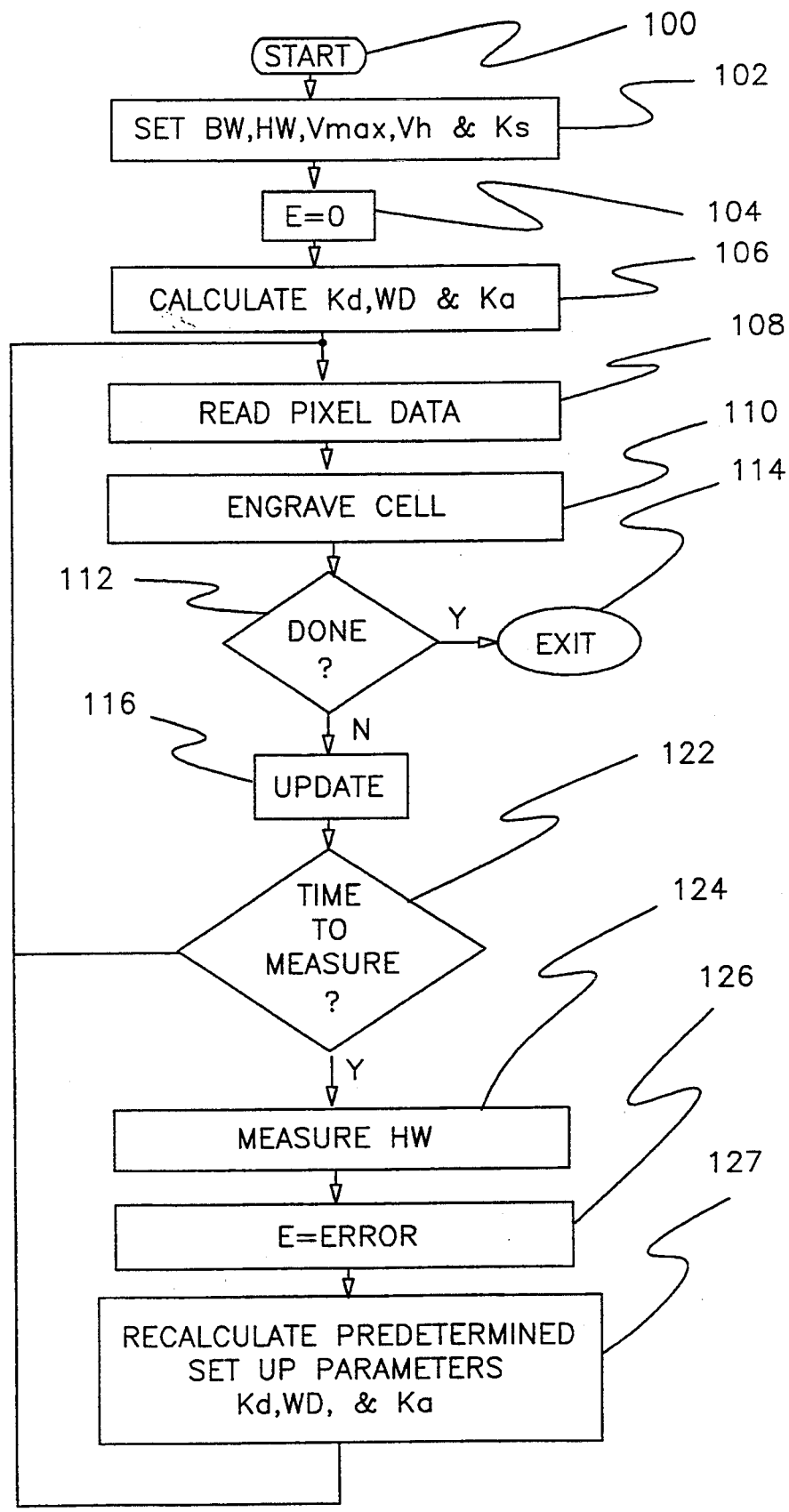
FIG. 4 is a flow chart illustrating the method of cell width control in accordance with the invention.

Referring to FIG. 1 there is illustrated a gravure printing cylinder 10 mounted for rotation by a drive motor 12 and engraving by an engraving stylus 20. During the engraving operation, stylus 20 moves engravingly toward and away from printing cylinder 10 to produce a series of cells arranged along a track 30. A lead screw motor 14 rotates a leadscrew 56 to cause movement of stylus 20 in a direction parallel to the axis of cylinder 10. If lead screw motor 14 moves continuously, then track 30 will have a helical configuration. Intermittent energization of motor 14 produces a series of spaced circular tracks 30.

Stylus 20 is driven into engraving contact with print cylinder 10 by an electromagnetic driver 61 operating in response to a drive control signal on line 60. Electromagnetic driver 61 may be configured as generally disclosed in Buechler U.S. Pat. No. 4,450,486.

The signal on line 60 has an AC component, a video component and a white offset component appropriate for producing an engraving action as hereinafter described. The AC component is derived from an AC input signal generated by a clock 47 and applied to a computer 34. The AC input signal is multiplied by a multiplication factor Ka as described in detail in Ser. No. 08/022,127. Computer 34 generates the video component by calculating another multiplication factor Kd and multiplying it against a video input signal. The white offset is derived from an offset signal WD.

Computer 34 generates the parameters Ka, Kd and WD by solving a set of three equations as described below. A control panel or keyboard 32 is provided in order enable entry of values for six constants appearing in the three equations. These constants are black cell width, BW, highlight cell width, HW, channel width, CW, the video voltage, Vh, corresponding to HW, HW, a stylus constant, Ks, and the black cell voltage, Vmax. A shoe offset, S, may also be entered if desired.

As hereinafter discussed in more detail, the AC component of the signal on line 60 causes stylus 20 to oscillate in a sinusoidal manner relative to printing cylinder 10 with a wavelength dependent upon the surface speed of the cylinder. The rotational speed of drive motor 12 must be adjusted so as to produce an engraving track 30 having an odd number of half wavelengths during a full engraving rotation. Computer 34 transmits a lead screw control signal to lead screw motor 14 via a line 24. This signal is adjusted so as to cause lead screw motor 14 to advance stylus 20 an axial distance equal to one-half of a black cell width plus one-half of a connecting channel width, plus one separating wall width during each complete rotation of the printing cylinder 10.

The equations for Ka, Kd and WD assume a linear relationship between the input video signal and a resultant engraved cell width. While this is a fairly accurate assumption in many cases, there are times when adjustments are required. If so, then tabulated corrections may be made as taught in Ser. No. 08/022,127, the parent application hereof, the disclosure of which is incorporated herein by reference.

Another problem is drift. Although computer 34 may be programmed properly and may initially produce correct cell widths, gain changes in analog components or mechanical changes in the positioning of the shoe which supports stylus 20 may require incorporation of an adjustable correction term in the algorithm employed for calculation of Ka, Kd and WD. For this purpose there is a videoing means or images, such as video camera 46, which is focussed on track 30. Camera 46 views a portion of track 30 which is illuminated by a strobed lamp 58 and provides frames of video feedback information to a video processor 41. Strobe signals for lamp 58 are provided at the correct frequency and phase by a cell counter 42 on line 55.

Although not shown, in the embodiment of the invention, the strobed lamp 58 is integral with the video camera 46 so that the strobe flashes through a lens (not shown) of video camera 46. In addition, the video camera 46 may have an auto-focus camera or attachment 202 for enabling it to focus on any size print cylinder 10. The video processor 41 is capable of controlling the autofocus feature so that if, for example, the printing cylinder 10 is changed to a printing cylinder having a different radius. The video processor 41 includes conventional circuitry to ensure that the image is in focus. Cell counter 42 counts pulses generated by a clock 47 at four times the AC frequency. At this frequency a clock pulse is generated each quarter wavelength of engraving stylus oscillation.

The geometrical configurations of typical black cells, connecting channels for black cells, highlight cells and separating walls are illustrated in FIG. 2. That figure depicts a series of wide, deep black cells 70 and a series of shallower and narrower highlight cells 76. The illustrated cells comprise portions of three side-by-side engraving tracks 30. Black cells 70 have a maximum width BW. The control signal for the stylus is adjusted so as to produce connecting channels 72 between successively engraved black cells 70. Channels 72 have a width CW, while highlight cells 76 have a width HW. The scalloped edges of the cells 70 result from the vertically oscillating cutting action of stylus 20 during rotational movement of printing cylinder 10 thereunder. As further illustrated in FIG. 2, a series of successively engraved black cells 70 may be separated by a wall 74 from a series of successively engraved cells 70 (also illustrated as being black cells) in an adjacent engraving track 30.

A series of cells configured as illustrated in FIG. 2 will print a graphic pattern defining a diagonally extending screen. The tangent of the screen angle is the ratio of the black cell width to the wavelength of the stylus cutting motion. The cutting wavelength is a function of the surface speed of the printing cylinder 10 and the oscillation frequency of stylus 20. Thus, the screen angle may be adjusted by adjusting the rotational speed of drive motor 12, but such adjustment must be made in incremental steps so as to maintain an odd number of half wavelengths around the circumference of the printing cylinder. Alternatively, the screen angle may be adjusted by adjusting the black cell width and the operating speed of leadscrew motor 14.

The driving signals for stylus 20 and the resulting vertical movement of the stylus 20 are illustrated in FIGS. 3A–3C. The driving signal (FIG. 3A) is obtained by adding an AC signal 80 (FIG. 3A) to a video signal 82 (FIG. 3B). The illustrated video signal 82 has, by way of example, a white video level 86, a black video level 88 and a highlight video level 90. The video signal and the AC signal are combined with an offset such that the stylus is raised out of contact with the cylinder surface during the entire time that video signal 82 has a white level 86. The minimum white elevation is WD.

When video signal 82 goes from a white level to a black level, stylus 20 moves into engraving contact with the cylinder as shown by stylus position line 84. In this condition the stylus oscillates between a minimum depth CD and a maximum depth BD. When stylus 20 is at the depth CD, it engraves a connecting channel 72. When video signal 82 shifts to a highlight level as indicated by the reference numeral 90, stylus 20 oscillates between a position out of engraving contact with cylinder 10 to an engraving position having a maximum depth HD. AC signal 80, video signal 82 and a white offset signal are produced by setup circuit 34.

In general, a set of predetermined setup parameters (BW, HW, CW, Vh, Ks and Vmax) may be inputted into control panel 32. These predetermined setup parameters generally correspond to the desired dimensions of, for example, either the highlight cell 76 or cell 70. These parameters are received by computer 34 which, in turn, generates a plurality of energizing signals (Ka, WD and Kd) in response thereto. The input signals control the depth of stylus 20 at any instant in time. In the embodiment being described, the computer 34 determines the depth of stylus 20 by using the following equations.

$$D(t) = Ka * A * (\sin(\omega * t) - 1) - WD + Kd * V(t)$$

where:
Ka = gain factor of the AC amplifier
A = maximum value of the AC reference signal
$\omega$ = frequency of AC reference signal
t = time
WD = white offset
Kd = gain factor of video amplifier
V(t) = video voltage at input (function of time)

The maximum black depth occurs when $\sin(\omega * t) = 1$ and v(t) = Vmax. Therefore the black depth is given by:

$$BD = Kv * Vmax - WD \quad (1)$$

The channel depth CD occurs when $\sin(\omega * t) = 0$ and v(t) = Vmax. Therefore the channel depth is given by:

$$CD = Ka * A - WD + Kv * Vmax \quad (2)$$

The highlight depth HD occurs when $\sin(\omega * t) = 1$ and v(t) = highlight voltage Vh. Therefore:

$$HD = Kv * Vh - WD \quad (3)$$

For an engraving operation using a stylus having a cutting tip angle (tip), the depths BD, CD and HD are respectively equal to Ks * BW, Ks * CW and Ks * HW, where Ks is a stylus constant given by the equation:

$$Ks = 1 / (2 * \mathrm{TAN}(tip/2)).$$

Making the above indicated substitution, equations (1)–(3) can be rearranged to produce:

$$Kv = Ks * (BW - HW + E) / (Vmax - Vh) \quad (4)$$

$$WD = Kv * Vmax - Ks * BW \quad (5)$$

$$Ka = (Ks * CW + WD - Kv * Vmax) / A \quad (6)$$

where E is an error which is used to correct the solution for observed errors in HW.

Equations (4)–(6) may be solved in sequence. Thus the value of Kv obtained from the solution of Equation (4) may be used in the solutions of Equations (5) and (6), and the value of WD obtained from Equation (5) may be used in Equation (6). Computer 34 proceeds in this fashion to calculate Kv, WD and Ka. Alternatively, the screen angle (SA) and the wavelength (WL) of the stylus cutting motion may be used as setup parameters. In that case BW may calculated from the equation:

$$BW = WL * \tan(SA)$$

This value of BW then is used in the computation of the engraving parameters.

In the event that there is a small error in the positioning of the shoe against printing cylinder 10, then an additional predetermined setup parameter S may be supplied to computer 34. If this parameter is provided, it is treated as a depth offset which is multiplied by Ks and added to BW, CW and HW prior to performing the above outlined solution.

Figure 5:
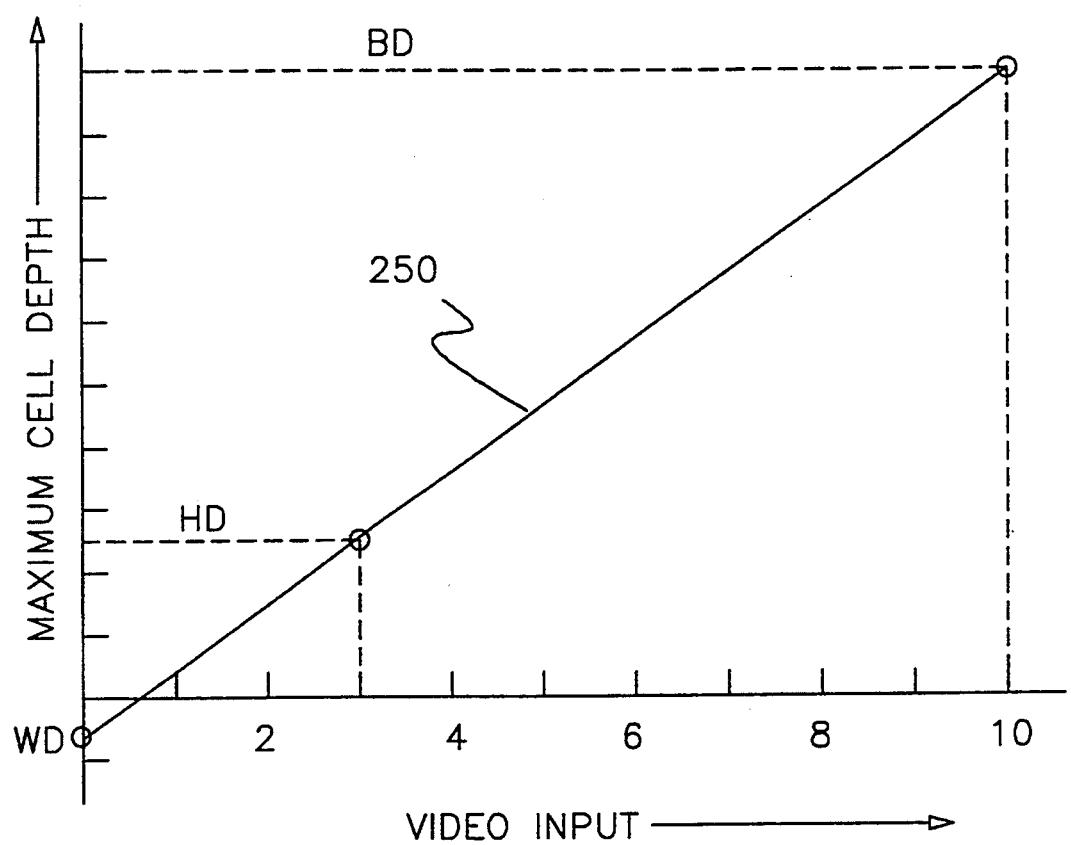
FIG. 5 is a graphical plot of the maximum cell depths resulting from video input signals ranging from 0 to 10 volts.

Referring now to FIG. 5, the maximum cell depth is seen to be directly proportional to the video input signal. As illustrated in the figure, a maximum 10 volt video input signal produces the maximum cell depth BD required for engraving a black cell. For the illustrated example, computer 34 has been given a highlight width HW = 0.25 * BW. Hence the highlight depth HD is 25% of BD. The Figure also reflects a setting of 3 volts for Kh. Under those conditions a video signal having an amplitude equal to 30% of a "black" video signal produces a cut having a depth which is only 25% of the black cell depth. As a result the maximum cell depth goes to zero for a video input of about 0.7 volts. For video signals smaller than that amount, the cutting stylus remains out of contact with the printing cylinder. For a "white" video input the stylus is retracted from the engraving cylinder by a minimum distance WD, which is the white offset.

During the initial setup of the print cylinder 10 for engraving or even after engraving has begun, it may be desirable to adjust the predetermined setup parameters BW, HW, Vh, Ks, and Vmax and their associated energizing signals Kd, WD and Ka to reflect differences between the predetermined setup parameters and an actual measurement of a portion of an engraved area (FIG. 2). This facilitates providing a closed-looped system which can be self-adjusting and self-monitoring. In order to effect this closed-looped system, it is necessary to calculate an error value which generally corresponds to difference between the predetermined setup parameters and an actual measurement of the portion of the engraved area on the print cylinder. Once the error value is determined, the computer 34 can adjust the predetermined setup parameters and corresponding energizing signals Ka, WD and Kd in response to the error value E.

It is important that camera 46 may be adjusted for viewing a precisely determined position of track 30. It is to be noted that an individual cell is strobed while the engraver is engraving. For this purpose. stylus 20 is activated to engrave a test track at one end of cylinder 10. Although it is possible that an operator could view a monitor or display (not shown) and manipulate a cursor control knob (not shown) on the above-mentioned keyboard, computer 34 is capable of automatically strobing a flash and capturing an image on the video camera 46. The video processor gets the new image and measures the width of the strobed cell and its associated channel. This information is sent to computer 34 as cell size feedback information. Since there is a distance between the stylus 20 and the camera pickup 46, computer 34 has to save a cell position distance count between camera 46 and stylus 20. The computer uses this position offset count to time strobes on line 55 for imaging specific cells known to have been engraved at particular points in time.

FIG. 4 illustrates the overall process involved in controlled engraving and error correction system according to one embodiment of the present invention. The process begins at an entry point indicated by the reference numeral 100. The first step is the entry of the setup parameters BW, HW, Vmax, Vh and Ks (Block 102). These parameters may be read from a disk file or entered into a keyboard by an operator. In the case of operator entry, the predetermined setup parameters may be obtained by visual observation of cells in a manually controlled sample track which is cut at one end of printing cylinder 10. However entered, the predetermined setup parameters are stored in computer 34 for setup control. Computer 34 then sets the value of the error term, E, equal to a zero (Block 104) and proceeds to calculate the engraving drive parameters Kd, WD and Ka using equations (4)–(6) above (Block 106). This puts the system in readiness to commence engraving.

Once the engraving drive parameters are available, computer 34 generates the energizing or control signals which cause video data to be read pixel data from an appropriate data file (Block 108). Other control signals activate drive motor 12, leadscrew motor 14 and workhead 16, and engraving begins (Block 110). Computer 34 then begins checking the progress of the engraving job (Point 112). The system exits at Point 114 when the job is done.

In one embodiment, the error value E may be determined by using one predetermined setup parameter, namely, Vh. In general, the error correction system calculates error value E by comparing the most frequently occurring value of Vh for a plurality of cells that have actually been cut to a value of Vh which is determined by taking an actual measurement of a preselected cell 606 (FIG. 7) which has been cut. A most frequently occurring value of Vh is assumed to be the system setup parameter or the predetermined setup parameters. Therefore computer 34 maintains a record of the frequency of occurrence of different values of Vh (Block 116) and compares the set value of Vh against the value of Vh which is found to be most frequently occurring. When the set value is found to deviate more than a prescribed minimum amount from the most frequently occurring value, then the predetermined setup parameters and corresponding energizing signals are adjusted. In the embodiment being described, a corresponding new value of HW may be calculated. This calculation involves solution of the equation:

$$HW = (Kd * Vh - WD) / Ks.$$

As the engraving proceeds, periodic checks are made to ascertain whether the system is engraving highlight cells of width HW in response to video input signals of voltage Vh. When a measurement time arrives, as indicated by the check at Point 122, the system proceeds to Block 124. This block involves a strobing of lamp 58 which causes camera 46 to generate a frame of video information. Video processor 41 is also strobed to measure the width of a highlight cell which appears in the video frame and which is known to have been engraved in response to a video voltage Vh. The error term, E, is set equal to the difference between the actual measured value HW and the current setting of HW. The system then proceeds back to Block 127 where the predetermined setup parameters, such as Kd, WD and Ka, are recalculated in computer 34 using the new value of E. This has the effect of eliminating or reducing the error value E. The system then returns to block 108.

Video camera 46 is mounted on a frame 57 supported by leadscrew 56. Camera 46 is adjustable relative to frame 57 so as to generate frames of video information which are centered upon track 30. Preferably, camera 46 comprises a CCD array which produce a new frame of video information with each flash of lamp 58.

It is important that camera 46 be adjusted for viewing a precisely determined portion of track 30. For this purpose stylus 20 is activated to engrave a test track at one end of cylinder 10. Computer 34 saves this position count and uses it to time the strobes on line 55 for imaging specific cells known to have been engraved at particular points in time.

Figure 6:
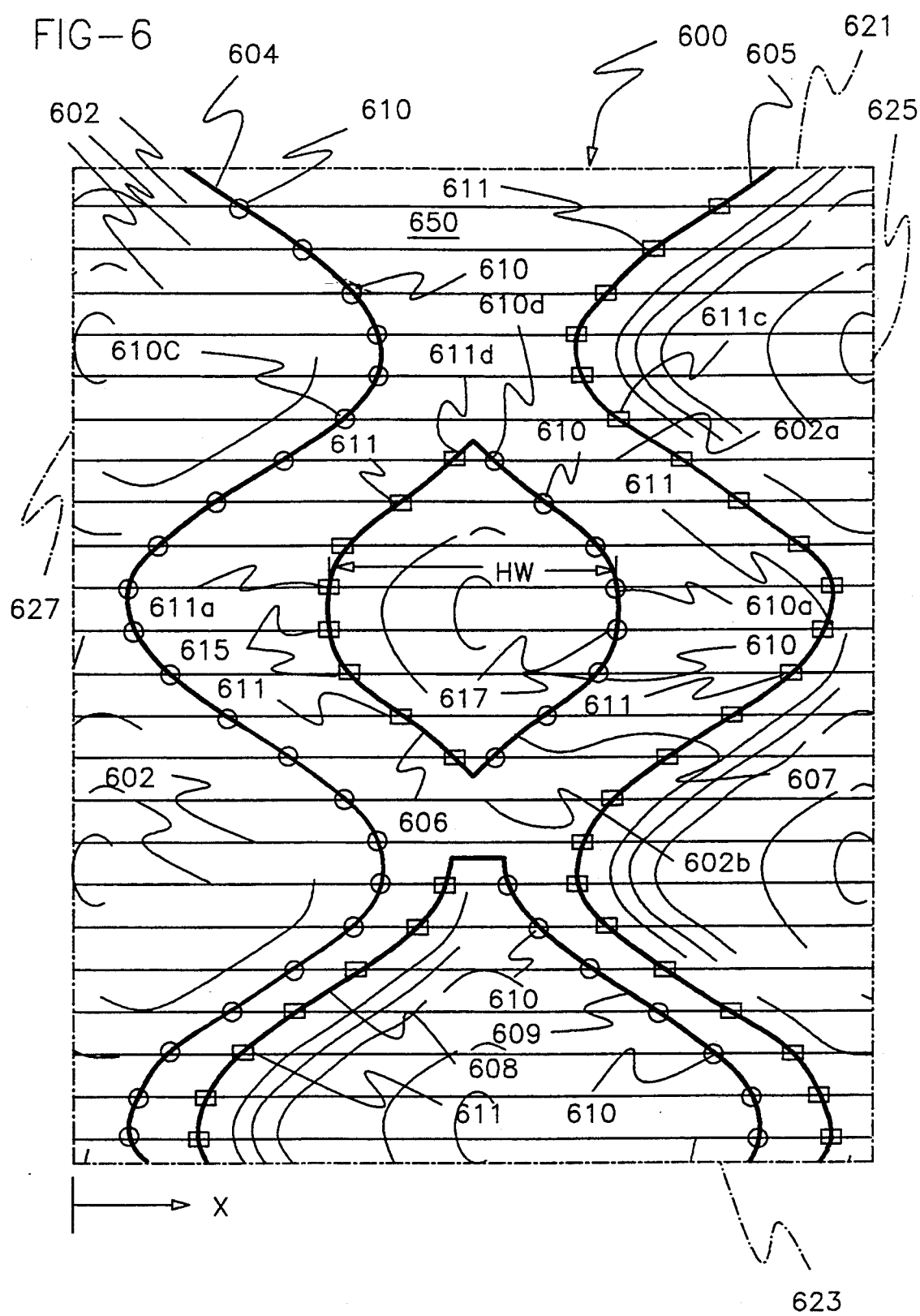
FIG. 6 is a schematic illustration of a video frame including a highlight cell.

FIG. 6 illustrates a typical frame of video information 600 including a highlighted cell 606 which was engraved PC clock counts prior generation of the strobe which produced the frame 600. Frame 600 comprises a series of horizontal lines which are too numerous for illustration. Representative horizontal video lines are indicated by the reference numerals 602. These lines are a subsampling of the cell image captured by the strobe. The actual cell size dimensions are measured from these lines.

Video processor 41 processes lines 602 sequentially from top to bottom. The video information goes through localized thresholding (not shown). Pixels which are lighter than the threshold are deemed to be white, whereas pixels which are darker than the threshold are deemed to be black. In the embodiment being described, the threshold amounts are set at a preselected gray scale.

As each line of video information is processed by thresholding, it is examined for the presence of black/white and white/black transitions. FIG. 6 illustrates black/white transitions by symbols denoted by the reference numeral 610, whereas white/black transitions are denoted by symbols indicated by the reference numeral 611. This establishes a series of boundary lines as illustrated in FIG. 6 by reference numerals 604, 605, 606, 607, 608 and 609. These boundary lines define a white region 650.

Video processor 41 recognizes the white region 650 by a black/white transition 610 followed by a white/black transition 611. For each such transition pair, video processor 41 establishes a first linked list. If the programming is performed in the C language, for example, then such a linked list may be represented by an entity known as a structure. Each such linked list includes the X coordinates of the left and right boundaries of the white region indicated by the transition pair. The linked lists for each scan line 602 are associated with the linked lists of the preceding scan line by comparison of the boundary points.

For the first six video lines 602 of FIG. 6, only one white span (and one linked list) appears. However, on the seventh horizontal line, denoted by the reference numeral 602a, two additional transition points 611d, 610d appear. These two new transition points mark the boundaries of highlight cell 60. It can be seen that the appearance of highlight cell 60 causes a "split" in the white region 650. Video processor 41 reacts to this split by establishing a second and third linked lists to replace the first linked list previously being processed.

Once a split is observed, the video processor knows that highlight cell 606 is present. The video processor then compares the left boundary of the third linked list with the right boundary of the second linked list to determine the width of the highlight cell 606. The highlight width is calculated for each scan line 602 and compared with the highlight width calculated for the preceding scan line. Each time a comparison is made, video processor 41 saves the larger value. The process continues until the intermediate black region disappears (at 602b) and the two legs of white region 650 merge. At this point the measurement ceases and the processor saves the observed maximum value of HW. Video processor 41 passes this value of HW to computer 34. The computer 34 associates the reported value of HW with the specific engraving command, which was sent to stylus 20 PC clock counts earlier than the strobe which produced the video frame. For this purpose computer 34 samples the video information which is supplied to multiplier 38.

Figure 7:
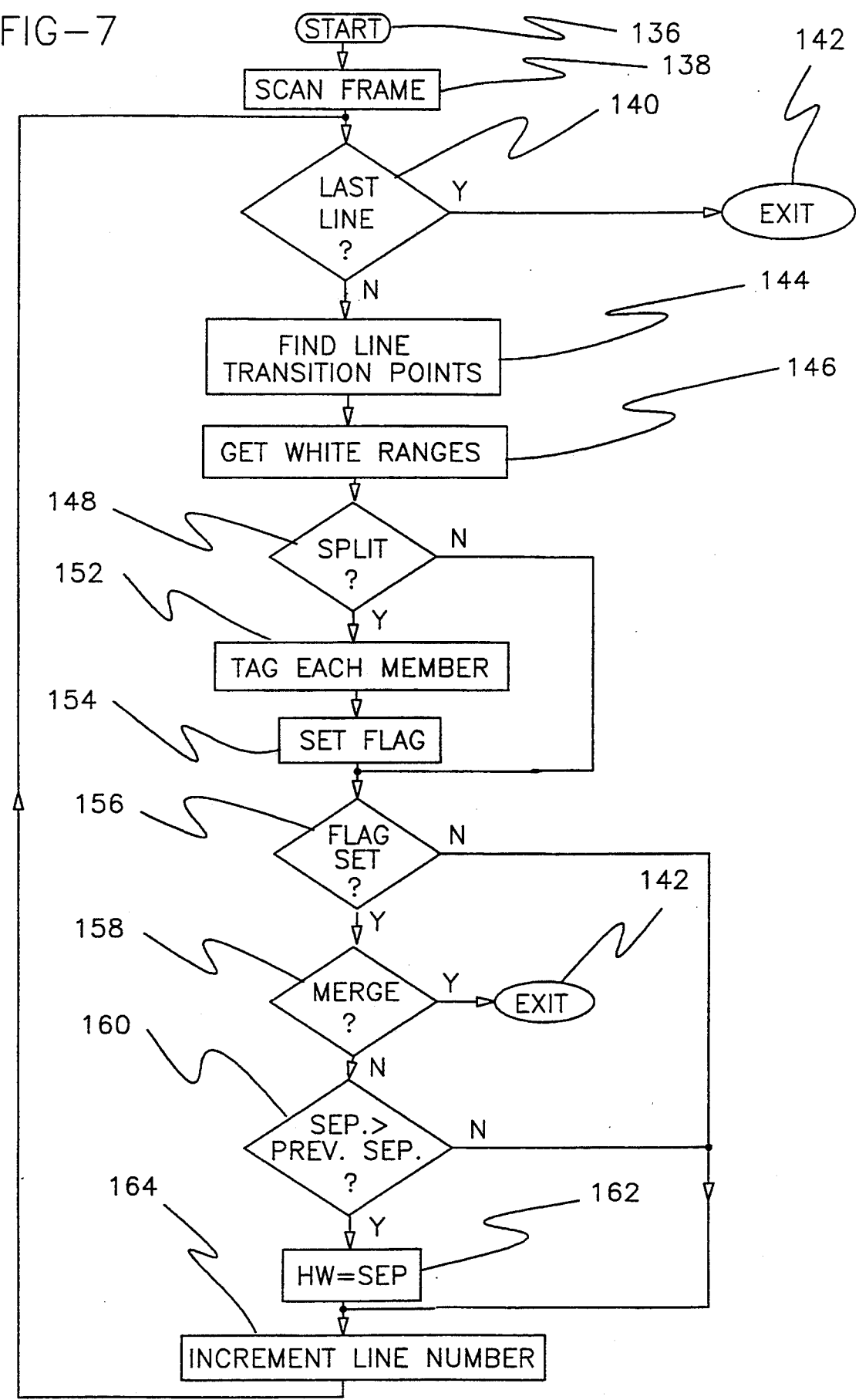
FIG. 7 is a flow chart of a cell width measuring algorithm.

FIG. 7 illustrates the above outlined measuring process in flow chart form. Thus, HW measurement begins at a start point 136 and proceeds to a scanning step at block 138. As discussed above, frame grabbing or scanning is initiated by a strobe signal on line 55. It should be appreciated that the cylinder could be stationary (i.e., not revolving during) the videoing, measuring and error correction process. It should also be noted that the system and method for measuring may be used independently to provide means for measuring portions of actual cuts in cylinder 10. Thus, the system and method of measuring per se could be used to measure the actual measurements for display on a monitor (not shown) so that subsequent manual adjustments, for example, can be made to correct for any errors.

Once a frame has been scanned the video processor checks the line number at point 140. If the bottom of the frame has been reached, then there is an exit at point 142. Assuming that the frame bottom has not been reached, the program proceeds to block 144 where it establishes transition points 610, 611. Then the program obtains the white ranges at block 146 for use in the above-described linked lists. Next the program looks for a split at point 148. If a split is noted, then the two resulting linked lists are tagged at block 152 and a flag is set at block 154.

The program checks the state of the flag at point 156 and jumps down to block 164 for a negative result. This means that the top of highlight cell 606 has not yet been reached and there is no need to measure a cell width. Consequently, the program simply increments the line number at block 164 and returns back to point 140.

If the check at point 156 indicates that the flag has been set, then the program checks for a merge at point 158. If a merge is noted, then the program exits from the measurement routine. If a merge has not yet occurred, then the program checks the separation distance between the two legs of the white region 650. This distance is compared at point 160 against previously saved separation distances. If the new separation distance is greater than any previously saved distance, then HW is set equal to that distance. Referring again to FIG. 6, the first separation distance is the distance between points 611d and 610d. This distance keeps increasing until the program reaches points 611a and 610a. At that point the separation distance is maximum, and no further adjustments of HW are made.

The video processor 41 then feeds the measured value of HW back to computer 34 and it is compared to the most frequently occurring value of HW. If the difference is below a predetermined threshold or zero, then no adjustment is made to the predetermined setup parameters. If on the other hand, there is a difference between the HW measured and the most frequently occurring value of HW, then computer 34 adjusts the predetermined setup parameters until the engraver is cutting cells that fall within the predetermined setup.

Thus, in the embodiment being described, this invention comprises a method for measuring a portion 67 (FIG. 2) of an engraved area 69 on the cylinder 10 during rotation of the cylinder 10 or while the cylinder 10 is stationary. The method uses video processor 41, videocamera 46 and strobe 58. The method comprises the steps of videoing the portion 67 of the engraved area 69 and generating a video image (such as the image shown in FIG. 6) corresponding thereto. These steps are effected by using the video processor 41 to process the video image data in order to determine the actual measurements of the portion which was videoed.

FIG. 8 shows another embodiment of the invention wherein the cell width BW, channel width CW, highlight width HW, and error value E are measured and determined using a similar technique. In this embodiment, video processor 41 determines the existence of the white region 650 by the black/white transition 610 followed by a white/black transition 611. The cell which was actually measured and strobed is assumed to be generally located in the center of the scan frame 600.

At this point, the video processor 41 begins a filling in process whereby it starts from a location somewhere within cell 606 and begins filling in memory locations associated or corresponding to cell 606 with gray scale values. Video processor first selects a black pixel, which is preferably centrally located within cell 606. Video processor 41 then "fills" the selected pixel and all adjacent black pixels with a half tone or gray value which is somewhere between the white and black values which are conventionally stored in memory.

This fill-in process continues until all pixels within cell 606 are filled with a half tone value. It is to be noted that if the half tone value reaches either a top 621 (FIG. 6) or bottom 623 of scan frame 600, the video processor has determined that it is measuring boundaries for cell 70 (FIG. 2) and channel 72. On the other hand, if the filled in pixels do not reach the top 621 or bottom 623 of scan frame 600, then video processor 41 regards the cell being measured as a highlight cell 76 (FIG. 2). If the half tones reach sides 625 and 627 of the screen, then video processor 41 determines that no cell is being measured.

For purposes of illustration, it will be assumed, as it was above, that video processor 41 is measuring a highlight cell 70 (FIG. 2) and 606 (FIG. 6) which was strobed by video camera 46 and strobed lamp 58. As video processor 41 completes filling in cell 606, it conventionally stores all black/white transition points and white/black transition points in memory.

After video processor 41 has completed filling in cell 600, the black/white and white/black transition points are located. These transition points generally correspond to the boundary lines or wall 606 (FIG. 6). The video processor 41 then examines these transition points and determines, by each horizontal scan line 602, the leftmost and rightmost (as viewed in FIG. 6) transition points. These transition points correspond to the points, like points 615 and 617 around the boundary of cell 606.

After all the boundary transition points have been determined, the maximum and minimum distances between transition points which lie on the same horizontal scan line 602 are determined. These values are conventionally subtracted by video processor 41, thereby resulting in values associated with the distance between the walls of highlight cell 606. Video processor 41 then scales these values to the pixel sizes of video camera 46 (FIG. 1).

In the illustration being described, and as viewed in FIG. 6, the largest difference between black/white and white/black transitions is at points 610a and 611a. The distance between these two points 610a and 611a represents the maximum separation distance, and consequently, the highlight width, HW. Video processor 41 determines that this is a highlight cell because no half tones reached the top 621 or bottom 623 of the scan frame 600.

It is to be noted that the channel width, CW, of channel 72 (FIG. 2) and cell width, BW, of cell 70 are determined in a similar manner by video processor 41. For example, the minimum distance determined by video processor 41 would correspond to the channel width, CW. If the video processor 41 determines that the minimum distance is below zero, then there is no channel and it is assumed a highlight cell, like cell 606 in FIG. 6, is being measured. As with the maximum distance, the minimum distance between black/white and white/black transitions which lie on the same line 602 are scaled to the magnification and pixel sizes of video camera 46 (FIG. 1).

Referring back to the illustration being described, once the highlight width, HW, has been measured, it is fed back to computer 34 and the error value E is determined. Computer 34 receives the highlight width HW and compares it to the HW corresponding to the predetermined set up parameters. If the error value E is below the predetermined threshold or zero, then no error adjustment is made to the predetermined setup parameters because the engraver is engraving highlight cells 76 (FIG. 2) having actual measurements which generally correspond to desired measurements prescribed by the predetermined setup parameters.

On the other hand, if the error value E is above the predetermined threshold, then an error adjustment is made. In this regard, computer 34 determines that the highlight cell 76 (FIG. 2) actually being engraved has dimensions which are different from the dimensions corresponding to the predetermined setup parameters. As mentioned earlier herein, computer 34 may use the most frequently occurring value of HW to determine the error value E. In this case, the error value E would represent the difference between the HW and the most frequently occurring value of HW which has been stored in memory for a plurality of highlight cells 76 which have been strobed and measured.

In the embodiment being described, computer 34 causes several measurements of the same size highlight cell 76 to be taken to verify the error value E. Computer 34 then adjusts one or more of the predetermined setup parameters BW, HW, CW, Vh, Ks, Vmax and S to account for the error value E.

FIG. 8 illustrates the measuring process according to this embodiment of the invention. The measuring process begins at start block 170 and proceeds to scan a frame of data at block 172. This is similar to the measuring process described above with respect to FIG. 7. After the scan frame of data is captured, the data is broken down into a plurality of localized sectors at block 174. Using a plurality of smaller localized sectors in this embodiment of the invention permits the video processor 41 and computer 34 to process data faster. Threshold points are determined for each localized sector. Thresholding is performed with each sector so that white/black and black/white transition points within that sector can be located. This process continues until all the black/white and white/black transition points are found for each sector in the scan frame and, ultimately, for the entire cell being measured at block 176. The video processor 41 begins the memory fill at block 180 by filling in all the black cavities for the cell being measured. Thereafter, the maximum and minimum transition points on a particular scan line are identified by video processor 41 at block 182.

At point 184, the video processor 41 checks to determine if the memory fill in has reached the sides 625 and 627 (FIG. 6). If it has reached sides 625 and 627, then video processor 41 determines that no cell or channel is being measured (block 186). If it has not reached sides 625 and 627, then video processor 41 determines if the fill in has reached top 621 or bottom 623 at point 188. If the top 621 or bottom 623 has been reached, video processor 41 calculates the channel width CW and cell width BW at block 190 using the maximum and minimum values determined at block 186. If the top 621 or bottom 623 has not been reached, then video processor determines the highlight cell width HW at block 192. After all the measurements have been determined, video processor exits at point 194, whereupon an error value E is determined by computer 34 in the manner described earlier herein.

Advantageously, this invention provides an error detection or error detector 101 and correction system suitable for providing a closed-loop system for engraving highlight cells 76 (FIG. 2), cells 70 and channels 72 in a gravure engraver. The error detection and correction system permit an error value E to be determined and fed back to computer 34, whereupon feedback adjustments can be made to one or more of the predetermined setup parameters. This permits the gravure engraver to engrave actual cuts, cells and channels in accordance with predetermined setup parameters.

It is to be noted that this system may be used during initial setup or during the normal operation of the gravure engraver. Thus, the system and method described herein can provide "real time" display of the actual measurement and "real time" correction for any error value E.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for measuring a portion of an engraved area on a cylinder in an engraver, said method comprising the steps of:
   videoing said portion of said engraved area and generating a video image corresponding thereto;
   using said video image to locate a transition between said engraved area and a non-engraved area and generate transition data corresponding thereto;
   generating at least one actual dimension value using said transition data.

2. The method as recited in claim 1 wherein said step further comprises the step of:
   measuring said portion of said engraved area during real time operation of said engraver.

3. The method as recited in claim 1 wherein said videoing step is effected by using a video camera and said generating step is effected by using a video processor which is coupled to the video camera.

4. The method as recited in claim 3 wherein said engraver is a gravure engraver and said portion is a cell which has been cut into said cylinder.

5. The method as recited in claim 2 wherein said method further comprises the step of:
   displaying said at least one actual dimension value during said real time operation.

6. The method as recited in claim 1 wherein said videoing step further comprises the step of:
   measuring said portion of said engraved area while the cylinder is stationary.

7. The method as recited in claim 6 wherein said measuring step further comprises the step of:
   displaying said at least one actual dimension value while said cylinder is stationary.

8. A system for measuring a portion of an engraved area on a cylinder in an engraver, said system comprising:
   an imager for capturing an image including said portion during rotation of said cylinder; and
   a video processor coupled to said imager for generating a plurality of actual dimension values corresponding to said portion.

9. The system as recited in claim 8 wherein said imager further comprises:
   a video camera for taking a video of said portion.

10. The system as recited in claim 9 wherein said imager further comprises:
    a strobe positioned with said video camera for strobing said portion.

11. The system as recited in claim 10 wherein said strobe is integral with said video camera.

12. A method for adjusting an engraver to engrave a cylinder with an actual cut according to at least one predetermined setup parameter, said method comprising the steps of:
    (a) determining an error value during real time operation of the engraver, said error value corresponding to a difference between said predetermined setup parameter and a measurement of said actual cut; and
    (b) using said error value to adjust said engraver to engrave in accordance with said at least one predetermined setup parameter.

13. The method as recited in claim 12 wherein said step (a) comprises the steps of:
    (a)(i) electronically measuring said measurement of said actual cut;
    (a)(ii) comparing said actual measurement to said at least one predetermined setup parameter.

14. The method as recited in claim 13 wherein said step (a)(i) comprises the steps of:
    (a)(i)(1) strobing a portion of a cylinder and generating a frame of data corresponding thereto;
    (a)(i)(2) determining a plurality of transition data corresponding to data transitions within said frame of data;
    (a)(i)(3) using said transition points to calculate a maximum distance value and a minimum distance value for a cell located within said engraved area.

15. The method as recited in claim 12 wherein said engraver comprises a computer capable of receiving a plurality of input signals corresponding to said at least one predetermined setup parameter and generating a plurality of energizing signals in response thereto, said step (b) further comprising the step of:
    (b)(1) using said error value to modify said plurality of energizing signals so that said engraver engraves in accordance with at least one said predetermined setup parameter.

16. The method as recited in claim 12 wherein said step (a) is effected by using a processor and a video strobe coupled to said processor.

17. The method as recited in claim 16 wherein said video strobe comprises an automatic focusing system.

18. An error correction system for use in an engraver suitable for engraving a cylinder with an actual cut in accordance with predetermined setup parameters, said error correction system comprising:
    determining means for determining an error value corresponding to a difference between at least one predetermined setup parameter and a measurement of said actual cut;
    said measurement being generated by locating a plurality of transition points corresponding to said actual cut; and
    a system coupled to said determining means for adjusting said engraver to account for any error value while engraving in accordance with said predetermined setup parameters.

19. The error correction system as recited in claim 18 wherein said determining means comprises:
    a strobe for strobing a portion of said cylinder and generating a frame of data in response thereto;
    a processor coupled to said strobing system for receiving said frame of data and also for generating said error value.

20. The error correction system as recited in claim 19 wherein said processor comprises:
    means for generating a plurality of sectors of data corresponding to said frame of data, for using said plurality of sectors of data to determine a minimum and maximum density range for each sector from which black/white and white/black thresholds can be determined and also for using said plurality of sectors of data to calculate at least one actual dimension of a cell within said portion of said engraved area.

21. The error correction system as recited in claim 20 wherein said strobe further comprises an automatic focusing system.

22. The error correction system as recited in claim 19 wherein said processor comprises a program for receiving said frame of data and for generating a plurality of transition points corresponding to black/white and white/black transitions, and also for using said transition points to calculate at least one actual dimension of said actual cut.

23. The error correction system as recited in claim 18 wherein said actual cut is a cell having any predetermined size.

24. The error correction system as recited in claim 19 wherein said system further comprises:
an engraving head;
a first driver for coupling a stylus to said engraving head and for causing said stylus to move towards and away from said cylinder;
a second driver coupled to said engraving head for driving the engraving head across said cylinder;
a third driver coupled to said cylinder for rotatably driving said cylinder;
a computer coupled to said processor and said first, second and third drivers; said computer receiving a plurality of input signals corresponding to said predetermined setup parameters and also generating a plurality of energizing signals for energizing said first, second, and third drivers to cause said engraver to engrave said actual cut having dimensions corresponding to said predetermined setup parameters, said computer also receiving said error value and adjusting said energizing signals such that said engraver engraves in a manner which reduces said error value.

25. An engraver for engraving a cylinder with an actual cut in accordance with predetermined setup parameters, said engraving apparatus comprising:
a cylinder rotatably mounted on a rotary support;
an engraving head having a stylus;
a first driver for causing said stylus to move towards and away from said cylinder;
a second driver coupled to said engraving head for driving the engraving head radially across said cylinder;
a third driver coupled to said cylinder for rotatably driving said cylinder;
a computer coupled to said first, second and third drivers; said computer receiving a plurality of input signals corresponding to said predetermined setup parameters and also generating a plurality of energizing signals for energizing said first, second, and third drivers to cause said engraver to engrave said actual cut having dimensions corresponding to said predetermined setup parameters; and
an error detector for determining an error value corresponding to a difference between a dimension corresponding to at least one of said predetermined setup parameters and a measurement of at least one actual dimension of a portion of an engraved area on said cylinder;
said computer being programmed to receive said error value during a real time operation of the engraver and to adjust said plurality of energizing signals such that said engraver engraves in a manner which reduces said error value.

26. The engraver as recited in claim 25 wherein said error detector comprises:
a strobe for strobing said portion of said engraved area and for generating a frame of data in response thereto;
a processing system coupled to said strobe for receiving said frame of data and also for generating said error value.

27. The engraver as recited in claim 26 wherein said processing system comprises an automatic focusing system.

28. The engraver as recited in claim 26 wherein said strobe further comprises an automatic focusing system.

29. The engraver as recited in claim 26 wherein said processor comprises a program for generating a plurality of histograms of data corresponding to said frame of data, for using said plurality of histograms data to determine a plurality of transition points corresponding to black/white and white/black transitions within said plurality of histograms of data, and also for using said plurality of transition points to calculate at least one dimension of said actual cut within said portion of said engraved area.

30. The engraver as recited in claim 25 wherein said actual cut is a cell of any predetermined size.

31. An engraving control for use in a gravure engraver having a stylus driver for driving a stylus towards and away from a cylinder, comprising:
input means for generating parameter signals indicating desired dimensions for cavities to be engraved by the stylus;
setup means for receiving said parameter signals and for generating an AC multiplication signal and a video multiplication signal;
multiplication means responsive to said AC multiplication signal and video multiplication signal for adjusting said AC multiplication signal and said video multiplication signal prior to application thereof to the stylus driver;
error detection means coupled to said setup means for generating an error signal during a real-time operation of the engraver corresponding to a difference between a characteristic corresponding to said desired dimensions and an actual characteristic of a portion of an engraved area on said cylinder; and
said setup means adjusting at least one of said AC multiplication signal and said video multiplication signal in a manner which thereafter reduces said difference.

32. The engraver control as recited in claim 31 wherein said error detection means comprises:
a strobe for strobing said portion of said engraved area and for generating a frame of data in response thereto;
a processor coupled to said strobe for receiving said frame of data and also for generating said error value.

33. The engraver control as recited in claim 32 wherein said processor comprises an automatic focusing system.

34. The engraver control as recited in claim 32 wherein said strobe further comprises an automatic focusing system.

35. The engraver control as recited in claim 32 wherein said processor comprises a program for receiving said frame of data and for generating a plurality of transition points corresponding to black/white and white/black transitions, and also for using said transition points to calculate at least one actual dimension of said engraved area.

36. The engraver control as recited in claim 31 wherein said engraved area is a cell having any predetermined size.

37. The engraver control according to claim 31 wherein said input means comprises means for indicating a desired black cell width, a desired channel width for channels connecting consecutively engraved cells and a desired highlight cell width.

38. The engraver control according to claim 37 wherein said input means further comprises means for indicating a highlight voltage signal; said setup means comprising means responsive to said highlight voltage signal for generating a white offset signal.

39. The engraver control according to claim 37 wherein said setup means comprises linearizing means for adjusting said AC multiplication signal and said video multiplication signal to compensate for nonlinear changes in engraving requirements.

40. The engraver control according to claim 39 wherein said linearizing means comprises means for tabulating at least one linearizing correction for a black cell width and a channel depth and a channel width, and means responsive to said at least one linearizing correction for performing said adjusting.

41. The engraver control according to claim 37 wherein said setup means comprises means for generating an offset signal sufficient for maintaining said stylus out of engraving contact with said cylinder when said video signal has a predefined value, and means for supplying said offset signal to said stylus driver.

42. The engraver control according to claim 31, said setup means comprising means responsive to said parameter signals for generating a white offset signal and an engraving control means for summing said white offset signal and said video signal.

43. A method for measuring a portion of an engraved area on a cylinder in an engraver, said method comprising the steps of:
videoing said portion of said engraved area as the cylinder rotates and generating a video image corresponding thereto;
using said video image to locate a transition between said engraved area and a non-engraved area and generate transition data corresponding thereto;
generating at least one actual dimension value using said transition data;
wherein said video processor comprises means for analyzing said image and for locating at least one transition point between said engraved area and a non-engraved area on said cylinder.

44. A method for measuring a portion of an engraved area on a cylinder in an engraver, said method comprising the steps of:
videoing said portion of said engraved area and generating a video image corresponding thereto;
using said video image to locate a transition between said engraved area and a non-engraved area and generate transition data corresponding thereto;
generating at least one actual dimension value using said transition data;
wherein said method further comprises the steps of:
comparing said at least one actual dimension value to a predetermined setup parameter and generating an error value in response thereto.

45. A method for measuring a portion of an engraved area on a cylinder in an engraver, said method comprising the steps of:
videoing said portion of said engraved area and generating a video image corresponding thereto;
using said video image to locate a transition between said engraved area and a non-engraved area and generate transition data corresponding thereto;
generating at least one actual dimension value using said transition data; and
using said error value to calibrate the engraver.

46. A method for measuring a portion of an engraved area on a cylinder in an engraver, said method comprising the steps of:
videoing said portion of said engraved area and generating a video image corresponding thereto;
using said video image to locate a transition between said engraved area and a non-engraved area and generate transition data corresponding thereto;
generating at least one actual dimension value using said transition data; and
performing the method while rotating the cylinder.

47. A method for measuring a portion of an engraved area on a cylinder in an engraver, said method comprising the steps of:
videoing said portion of said engraved area and generating a video image corresponding thereto;
using said video image to locate a transition between said engraved area and a non-engraved area and generate transition data corresponding thereto;
generating at least one actual dimension value using said transition data; and
strobing said portion of said engraved area.

48. The method as recited in claim 1 wherein said method further comprises the step of:
engraving said cylinder during said videoing step.

49. The method as recited in claim 13 wherein said measuring step comprises the step of:
determining a plurality of transition points corresponding to a transition between a cut portion and an uncut portion of said cylinder.

50. The method as recited in claim 13 wherein said actual cut comprises at least one engraved cell and said electronic measuring step comprises the step of:
determining which of said plurality of transition points correspond to said at least one engraved cell.

51. The method as recited in claim 50 further comprising the step of determining volume of said at least one engraved cell.

52. A method for adjusting an engraver to engrave a cylinder with an actual cut according to at least one predetermined setup parameter, said method comprising the steps of:
determining an error value corresponding to a difference between said predetermined setup parameter and a measurement of said actual cut;
using said error value to adjust said engraver to engrave in accordance with said at least one predetermined setup parameter; and
engraving said cylinder while performing said using step.

53. A method for adjusting an engraver to engrave a cylinder with an actual cut according to at least one predetermined setup parameter, said method comprising the steps of:
(a) determining an error value corresponding to a difference between said predetermined setup parameter and a measurement of said actual cut;
(b) using said error value to adjust said engraver to engrave in accordance with said at least one predetermined setup parameter; and
wherein said steps (a) and (b) are continuously conducted during real-time operation of the engraver.

* * * * *

UNITED STATES PATENT AND TRADEMARK OFFICE
CERTIFICATE OF CORRECTION

PATENT NO. : 5,438,422
DATED : Aug. 1, 1995
INVENTOR(S) : Holowko et al.

It is certified that error appears in the above-indentified patent and that said Letters Patent is hereby corrected as shown below:

Col. 3, line 44, after "order", please insert -- to --.

Col. 3, line 48, please delete "HW,".

Col. 4, line 11, please delete "images" and insert -- imager -- therefor.

Col. 4, line 68, please delete "(Fig. 3A)" and insert -- (Fig. 3C) -- therefor.

Col. 6, line 52, before "Vh" please insert -- CW, --.

Col. 7, line 24, before "Vh" please insert -- CW, --.

Col. 7, line 39, after "video" insert -- pixel -- and after "read" delete "pixel data".

Col. 7, line 53, please delete "(Fig. 7)" and insert -- (Fig. 6) -- therefor.

Col. 8, line 15, please delete "back".

Col. 9, line 10, please delete "60" and insert -- 606 -- therefor.

Col. 9, line 11, please delete "60" and insert -- 606 -- therefor.

Col. 9, line 41, after "revolving" please insert -- ) -- and after "during" please delete ")".

Col. 12, line 41, delete "186" and insert -- 182 --.

UNITED STATES PATENT AND TRADEMARK OFFICE
CERTIFICATE OF CORRECTION

PATENT NO. : 5,438,422
DATED : Aug. 1, 1995
INVENTOR(S) : Holowko et al.

It is certified that error appears in the above-indentified patent and that said Letters Patent is hereby corrected as shown below:

Col. 12, line 52, after "gravure" delete "engraver" and insert -- cylinder --.

Signed and Sealed this

Tenth Day of June, 1997

*Attest:*

BRUCE LEHMAN

*Attesting Officer*   Commissioner of Patents and Trademarks